P. S. LEKAS.
BUTTER CUTTER.
APPLICATION FILED MAY 20, 1916.
1,206,233.
Patented Nov. 28, 1916.
4 SHEETS—SHEET 1.
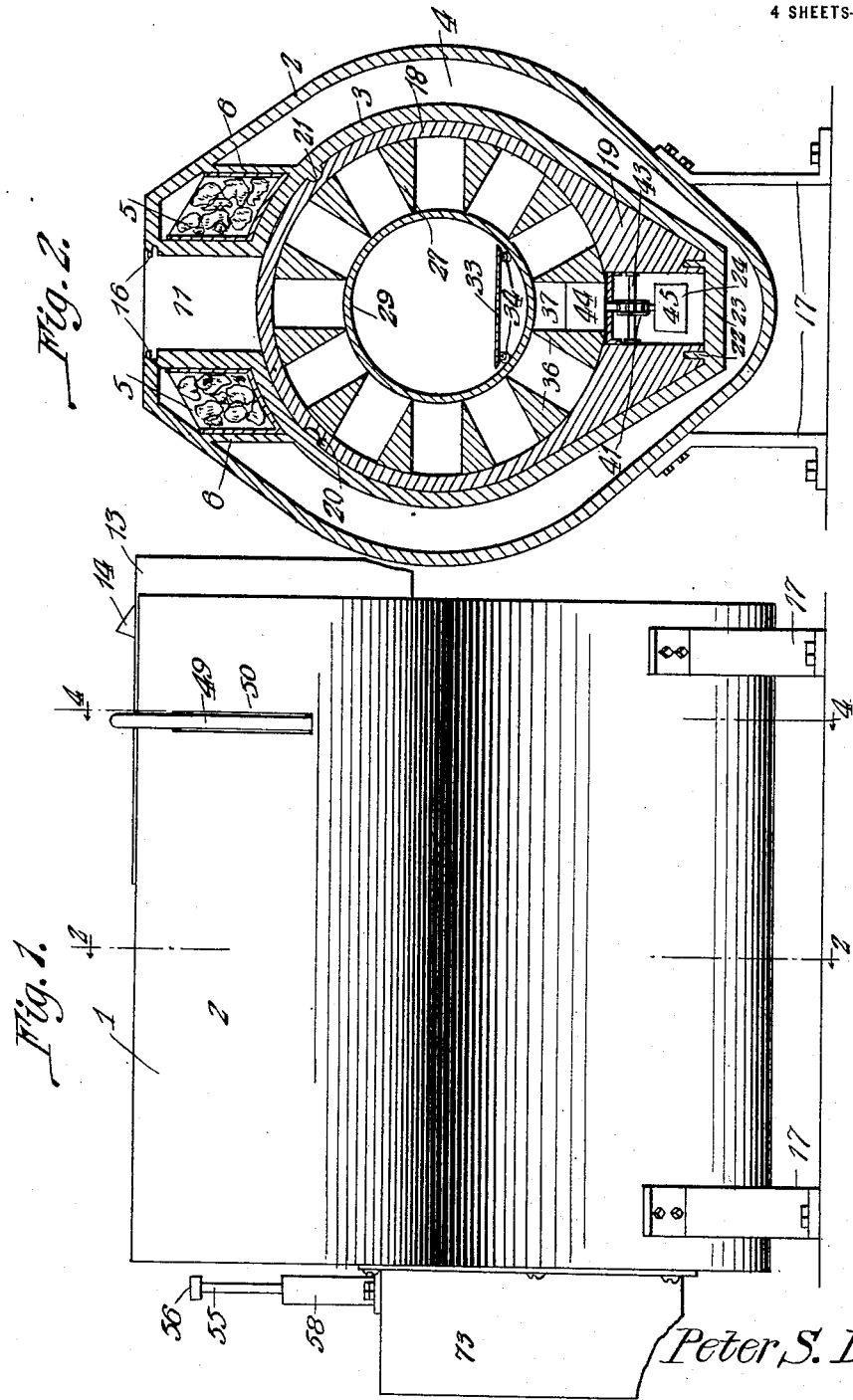
Peter S. Lekas,
Inventor
By Geo. P. Kimmel
Attorney P. S. LEKAS.
BUTTER CUTTER.
APPLICATION FILED MAY 20, 1916.
1,206,233.
Patented Nov. 28, 1916.
4 SHEETS—SHEET 2.
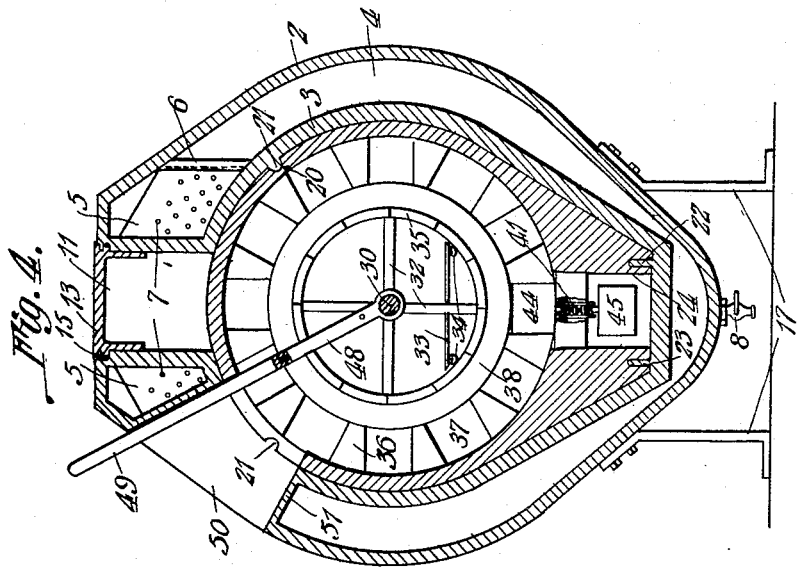
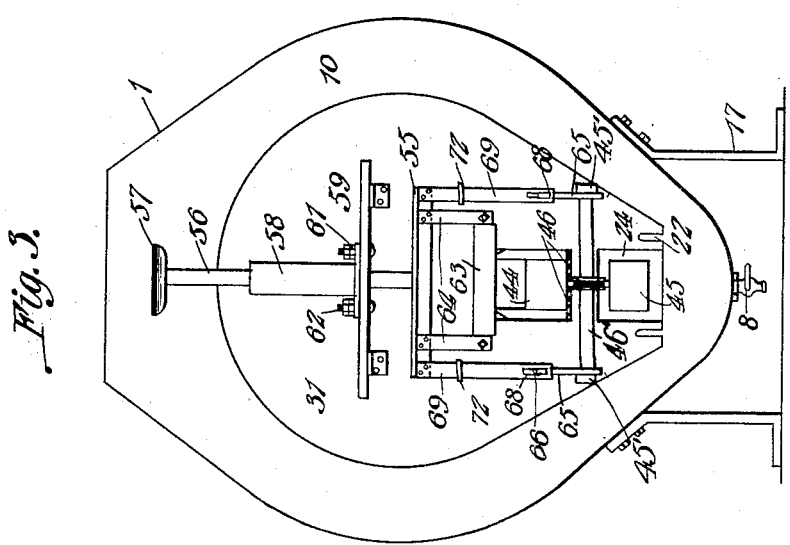
Peter S. Lekas,
Inventor
By Geo. P. Kimmel.
Attorney

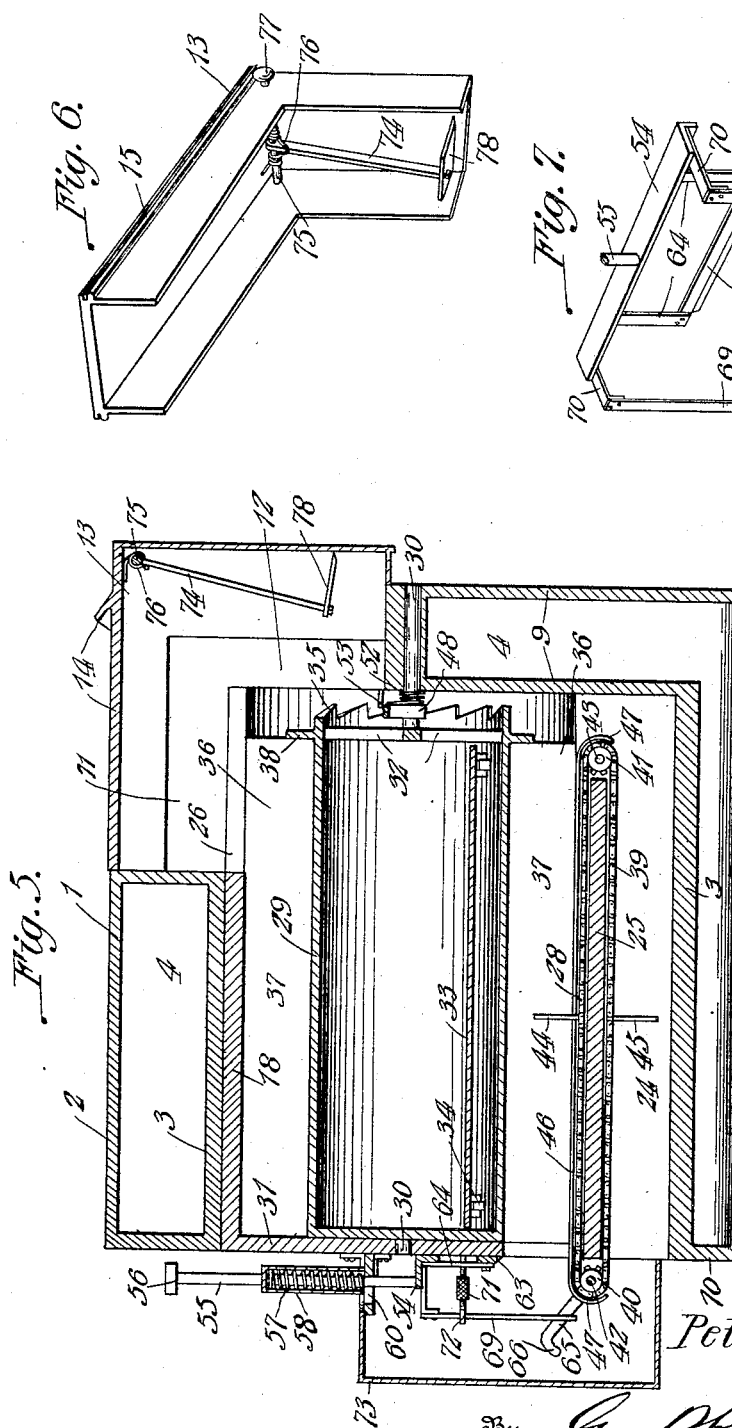

P. S. LEKAS.
BUTTER CUTTER.
APPLICATION FILED MAY 20, 1916.

1,206,233.

Patented Nov. 28, 1916.
4 SHEETS—SHEET 4.

Peter S. Lekas,
Inventor

By Geo. P. Kimmel.
Attorney ced parts throughout the various views, 1 designates

UNITED STATES PATENT OFFICE.

PETER S. LEKAS, OF PORTLAND, OREGON.

BUTTER-CUTTER.

1,206,233.  Specification of Letters Patent. Patented Nov. 28, 1916.

Application filed May 20, 1916. Serial No. 98,942.

*To all whom it may concern:*

Be it known that I, PETER S. LEKAS, a citizen of the United States, residing at Portland, in the county of Multnomah and State of Oregon, have invented certain new and useful Improvements in Butter-Cutters, of which the following is a specification.

The present invention relates to butter handling devices and more particularly to butter cutters.

An object of my invention is to provide in a simple, compact and cheap structure an improved butter cutter in which the rolls of butter are automatically fed to a cutter without the necessity of handling the butter.
out the necessity of handling the butter.

Another object of my invention is to provide a butter cutter of the class described having improved conveying and delivering means for the butter rolls whereby a plurality of rolls of butter may be handled and cut accurately.

A further object of my invention is to provide cooling means for association with my improved butter cutter to prevent softening of the butter when being fed to the cutter.

A still further object of my invention is to provide a butter cutter having improved entrance means associated therewith whereby access may be had to the interior of the feeding mechanism by the attendant, operating the device, said entrance means having a closure provided with a supplemental cutting member for reducing the size of the roll of butter when desired.

A still further object of my invention is to provide a butter cutter in which the cutting mechanism is adjustable to permit severing of a roll of butter into various sizes such as one pound and two pound blocks.

Other objects and advantages to be derived from the use of my invention will appear from the following detail description and the claims, taken with an inspection of the accompanying drawings, in which—

Figure 8:
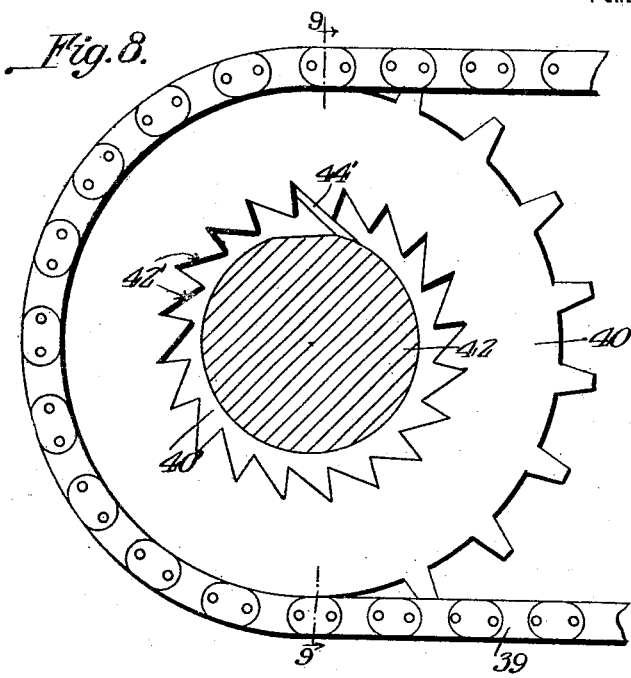
Figure 9:
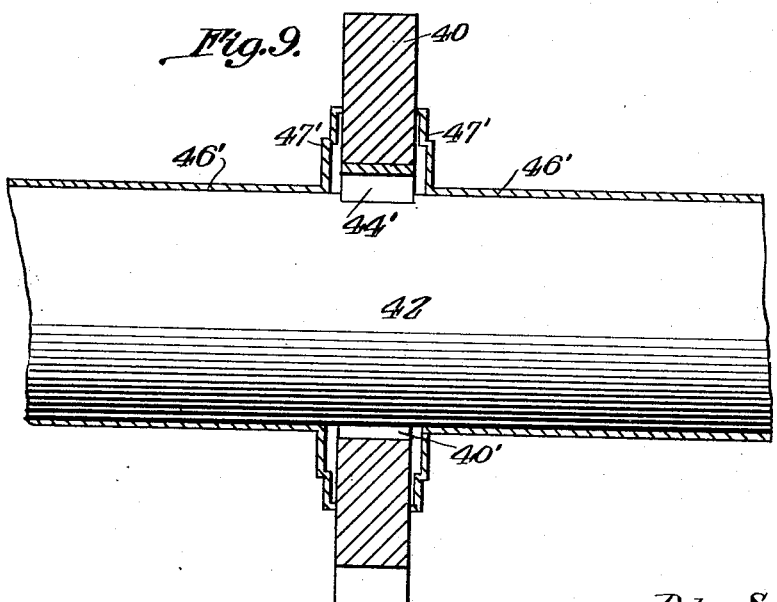

Figure 1 is a side elevation of a butter cutter embodying the improvements of my invention, Fig. 2 is a vertical transverse sectional view taken on the line 2—2 of Fig. 1, Fig. 3 is an end elevational view of my improved butter cutter showing the cutting mechanism; Fig. 4 is a transverse sectional view taken on the line 4—4 of Fig. 1, Fig. 5 is a vertical sectional view taken on the line 5—5 of Fig. 3, Fig. 6 is an enlarged perspective view of an improved closure member, Fig. 7 is a similar view of the knife carriage, Fig. 8 is an enlarged fragmentary elevational view of the propelling mechanism for the conveyer of my invention; and Fig. 9 is a vertical sectional view taken on the line 9—9 of Fig. 8 looking in the direction of the arrow.

Referring more particularly to the drawings, in which similar characters of reference designate like and corresponding parts throughout the various views, 1 designates in its entirety the housing of my improved butter cutter, said housing being formed with outer and inner walls 2 and 3, respectively, said walls being preferably cast integrally. The outer and inner walls form a jacket or cooling chamber 4 which is adapted to conduct a cooling medium for an obvious purpose. The cooling medium may be contained in cans or like receptacles 5 positioned at the upper portion of the housing, a plurality of posts 6 being cast integrally with the housing and extending between the outer and inner walls to support said receptacles. Needless to say, the receptacles are perforated as at 7 to permit the cooling medium as it melts to pass down the outer surface of the inner wall 3 and thence through the valve 8 at the lower end of the housing. The housing is preferably elliptical in cross section but modifications of this shape may be made without departing from the spirit and scope of my invention.

The rear end of the housing 1 is provided with end walls 9, said walls being integrally cast with the outer and inner walls 2 and 3. The front end of the device may be closed by an integrally formed wall 10. The top portion of the housing is formed with an opening 11 extending downwardly as at 12 to a point approximately centrally of the device to form an entrance for the butter to be cut. A closure 13 is provided therefor, said closure being preferably right-angular in configuration, one leg thereof extending from the opening 11 and the other leg from the portion 12 of said opening. A handle 14 is formed on the top of the closure 13. The closure 13 is flanged as at 15 for reception into grooves 16 formed in the top wall of the housing 1 adjacent the opening 11. The housing 1 is supported on legs 17.

The feeding and cutting mechanisms of my invention are carried in a frame 18, said frame being circular and having a tapering radial longitudinal enlargement 19 formed thereon, said frame having grooves 20 formed in the peripheral surface thereof for reception of flanges 21 formed on the inner wall 3, upstanding flanges 22 being formed on the base portion 23 of the inner wall 3 for engagement in complemental grooves in the enlargement 19.

The enlargement 19 is provided with a longitudinally extending recess 24, the opposite sides of which are connected by a longitudinally extending web 25 for strengthening the frame at this point.

The top portion of the frame 18 is provided with an inwardly extending recess 26 adjacent the rear end thereof to permit access through the entrance 11 to the conveyer hereinafter described. The frame 18 is adapted to be removably secured within the housing 1 in any suitable manner.

The feeding mechanism of my invention comprises two elements, namely, a rotatable conveying member 27 and a delivering mechanism 28. The conveying mechanism comprises a drum 29 mounted on stub shafts 30 extending from the opposite ends thereof and journaled in the end wall 31 and end walls 9 of the frame 18 and housing 1, respectively, the rear end of said drum being connected to the rear shaft by means of spokes 32, whereby to permit access to the interior of the drum. A tray 33 is mounted in the drum on rollers 34 and is adapted to receive reserve butter or may receive a cooling medium. In the latter case some means, (not shown) would be necessary to convey away the melted ice. The rear end of the drum 29 is formed with ratchet teeth 35 for a purpose which will hereinafter appear. A plurality of partitions 36 forming butter chambers are cast integrally with the drum 29 and a flange 38 also cast integrally with said drum serves to strengthen said partitions, the partitions being of such diameter as to snugly fit within the circular portion of the frame 18.

The delivery mechanism of my invention comprises a chain 39 trained over sprocket wheels 40 and 41 mounted on shafts 42 and 43, respectively, said chain carrying butter engaging blades 44 and 45, positioned at points approximately one-half the travel of the chain. A pair of plates 46 having downturned ends 47 are mounted over the chain 39 so as to form a slot through which the connection between the blades 44 and 45 and the chain may pass. The sprocket wheel 40 is shown to advantage in Figs. 8 and 9, said sprocket wheel being provided with a concentric opening 45 having ratchet teeth 42′ formed therein. A spring tongue 44′ extending tangentially from the shaft 42 being normally in engagement with one of the teeth. It will be seen that the shaft upon rotation in one direction will carry the sprocket wheel 40 in that direction by virtue of the engagement of the spring tongue 44′ with one of the teeth 42′. The mechanism for actuating the same will be described hereinafter. As best shown in Fig. 3 the shaft 42 is mounted in bearings 45′ carried by the inner body of the machine.

A pair of casings 46′ provided with annular flanges 47′ are carried by the shafts 42, said flanges engaging the sprocket 40 and preventing lateral movement of the same on the shaft. The free end portions of the casing 46′ engage the actuating mechanism in a manner which will hereinafter appear.

As shown to advantage in Figs. 2, 4 and 5 the rotary conveyer 27 is adapted to be moved to a position wherein one of the chambers 27 registers with the delivering mechanism 28 whereupon the butter contained in such chamber may be delivered in a manner hereinafter set forth.

In order to rotate the conveyer 27 I provide a lever 48 pivotally and slidably mounted on the rear stub shaft 30 and having a removable handle portion 49 extending through an opening 50 formed in the inner and outer walls of the housing 1, a wall 51 extending between said walls to prevent ingress of warm air to the cooling chamber. The lever 48 is adapted to engage the teeth 35 in succession as said lever is reciprocated, a coil spring 52 being wound about said shaft and having its free ends engaging said lever and the inner wall of the housing whereby to maintain said lever in the position shown in Fig. 4. This spring also permits longitudinal movement of the lever on the shaft 30 in order that the same may pass over the teeth. Any suitable means may be provided, such as a pin 53 for limiting the movement of the lever 48 when the handle is detached.

Referring now to the cutting mechanism and driving mechanism for the deliverer 28 I provide a knife carriage comprising an angle iron 54, best shown in Fig. 7, said angle iron being connected through a rod 55 with a depressible handle 56 maintained normally in the uppermost position by means of a coil spring 57 mounted in a laterally adjustable casing 58. The casing 58 is mounted on a bracket 59 slotted as at 60 to permit movement of the rod 55, nuts 61 mounted on suitable bolts 62 serving to lock the casing in an adjusted position. This adjustment permits movement of the knife to increase or decrease the length of block cut. The knife is designated 63 and is supported by hangers 64 carried by the angle-iron 55. As shown in Fig. 5 the knife is flush with the front wall 31 of the frame 18, but of course this may be adjusted to different positions.

The actuating mechanism for the deliverer 28 comprises a pair of levers 65 mounted on the free extremities of the shaft 42, the casing 46' abutting said levers, thereby maintaining the sprocket 40 at a point centrally of the shaft 42. The free ends of the levers 65 are provided with hook portions 66, said levers passing through apertures 68 formed in the arms 69 which depend from laterally extending arms 70 carried by the angle-iron 54. Thus, it will be seen that after a depression of the rod 56 and upon return of the same to normal position, such movement will be imparted to the shaft causing the sprocket 40 to rotate in the proper direction for feeding the butter to the knife. In order to adjust the knife 63 I provide turn-buckles 71 having engagement as at 72 with the arms 69. A suitable casing 73 may be placed over the cutting mechanism, for an obvious purpose.

In Fig. 6 I have shown the closure member 13, the closure member having an arm 74 pivotally mounted on a shaft 75 carrying a spring 76 normally maintaining said arm in the position shown. A knob 77 is carried on the free end of the shaft 75 for manipulating the arm, and a knife blade 78 is carried on the free end of said arm.

In operation, butter is fed into the machine through the opening 11, the roll of butter being placed in the uppermost chamber of the rotary conveyer 27. Movement is imparted to the conveyer by means of the handle 49. One oscillation of this handle will move the conveyer to bring the next chamber into position to receive another roll of butter. This operation may be continued until the roll of butter first mentioned is brought into the path of movement of the longitudinally movable conveyer 28. To sever the roll first mentioned into a plurality of blocks the knife is reciprocated vertically by means of the rod 55 which cuts the butter into blocks, the returning of the knife to inoperative position serving to actuate the delivering device. A suitable receptacle may be placed beneath the outer end of the delivering device 28 to receive the blocks of butter. Should it be desired to cut the roll of butter into various sizes before inserting the same into the machine the knife 78 may be used for this purpose.

In order to replenish the containers 5 the same are removably arranged in their relative positions and are adapted to be slid into and out of the position shown.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as claimed.

What I claim as new and desire to secure by Letters-Patent is:—

1. In a butter cutter, a housing, a frame in said housing, a rotatable butter conveyer comprising a drum having partitions radially extending therefrom forming butter receiving chambers, teeth formed on one end of said drum, an actuating lever engageable with said teeth to rotate the drum, cutting mechanism carried by the frame, and a butter delivering mechanism coöperating with said rotary conveyer for the purpose specified.

2. In a butter cutter, a housing, a frame removably mounted in said housing, butter feeding mechanism associated with said frame comprising a rotatable drum having butter chambers formed thereon, teeth formed on one end of said drum, a lever for engagement with said teeth to rotate said drum, spring means to permit engagement and disengagement of said lever with said teeth, and butter delivering mechanism coöperating with said rotary conveyer and connecting means operatively associated with said butter delivering mechanism to move the butter after each cutting movement.

3. In a butter cutter, the combination of a housing, a frame removably mounted therein, a butter distributing drum rotatable in said frame, said drum having a plurality of butter chambers, a conveyer having blades, said blades being movable in one of the butter chambers to deliver butter therefrom, a ratchet arm to intermittently move said conveyer, a knife operable with said arm, and a ratchet lever for rotating said drum.

4. In a device as specified, the combination with a housing, a frame removably mounted therein, and a drum rotatable in said frame having a plurality of butter chambers, of a conveyer having blades movable, at times, through one of the butter chambers, a pair of ratchet arms for intermittently actuating said conveyer, a carrier connected with said ratchet arms and vertically movable on the frame, means for actuating said carrier, and a knife carried thereby, vertical reciprocation of said carrier serving to move said conveyer intermittently to deliver butter or the like to the knife.

5. In a device of the class described, the combination of a housing, and a frame removably arranged therein, a butter drum rotatable in the frame, of a conveyer movable in said housing and coöperating with the drum to deliver butter therefrom, a pair of ratchets and levers for intermittently operating said conveyer, a carriage connected to said levers, and vertically movable on said frame, a knife on the carriage, a spring returned arm for depressing the carriage, means for adjusting the carriage to and from said frame, said carriage serving to move forward the conveyer when the knife moves to the inoperative position.

In testimony whereof I affix my signature.

PETER S. LEKAS.

Witnesses:
 GRACE S. HOWATT,
 HENRY S. WESTBROOK.

Copies of this patent may be obtained for five cents each, by addressing the "Commissioner of Patents, Washington, D. C."